Sept. 26, 1950      J. S. HICKEY, JR      2,523,761
INDICATOR SYSTEM
Filed Dec. 30, 1947
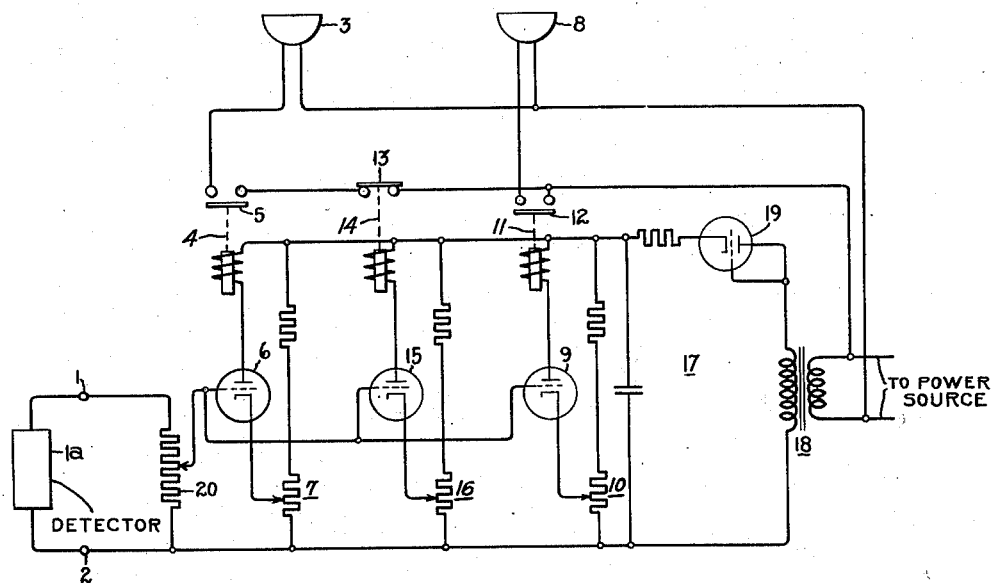
Inventor:
John S. Hickey, Jr.,
by Harry P. Mayers
His Attorney.

Patented Sept. 26, 1950

2,523,761

UNITED STATES PATENT OFFICE 2,523,761

INDICATOR SYSTEM

John S. Hickey, Jr., Schenectady, N. Y., assignor to General Electric Company, a corporation of New York Application December 30, 1947, Serial No. 794,508

4 Claims. (Cl. 177—311)

The present invention relates to an indicator system and more particularly to an indicator system adapted to distinguish readily between gradual and sudden changes of a variable to which the indicator system is responsive.

In large scale testing operations where the satisfactoriness of a quality of a thing under test corresponds to a value of current or voltage in the testing apparatus below a certain value and the unsatisfactoriness of the quality under test corresponds to a value of current or voltage suddenly attained and above a certain value, it is desirable to use an indicator means that gives a definite and easily discernible indication as to the satisfactoriness or unsatisfactoriness of that quality. The conventional pointer type meters are frequently lacking in this respect and moreover tend not only to fatigue but also require exercise of judgment on the part of the testing personnel. Elimination of both these factors would improve the accuracy and efficiency of the test personnel.

It is, therefore, an object of the present invention to provide an improved indicator system of the "Off-On" variety using electric responsive elements such as electric lights to indicate not only that the electric signal has attained a certain range of value but also whether the signals are drifting slowly or whether they are changing rapidly.

The features of the invention which I consider novel are pointed out with particularity in the appended claims. The invention itself together with its further objects and advantages may best be understood by reference to the following description when taken in connection with the accompanying single figure of the drawing which shows an embodiment of the invention.

In accordance with the object of the invention, a signal source, such as a vapor leak detector $1a$ of the type disclosed and claimed in application, Serial No. 754,657, filed June 14, 1947, by Chester Rice, and assigned to the assignee of this application, may be connected between terminals 1 and 2. This detector basically comprises a diode arrangement across which a potential is applied. When vapors containing very small amounts of a halogen element pass between the electrodes of the diode, a current is caused to flow between the electrodes and through an external circuit. The amount of current that flows is a function of the amount of the halogen vapor between the electrodes of the diode. Ambient factors such as temperature cause the amount of current passed by the diode to vary gradually over a small range. However, very small concentrations of a halogen vapor cause the current to increase quickly to a large value. Thus, in order to determine the presence of a halogen element in a vapor it is necessary to distinguish between sudden and gradual changes in the amount of current passed by the diode. The detector $1a$ may, for example, be employed to discover leaks in vapor containers and to that end may be caused to give a sudden electrical indication whenever the detector comes into proximity to a leak from which vapor is escaping. Functionally, an indicator element 3 is connected to the signal source by means of a relay 4 comprising the contactor 5. The indicator element 3, which could be an electric light, an electric horn, or any such suitable current responsive element, is responsive to a certain value of the signal. When weak signals are used it is desirable to employ an amplifying means such as vacuum tube 6 between the indicator element 3 and the signal source. By varying a bias control 7 on the vacuum tube 6 the minimum value of signal required to operate the indicator 3 can be readily controlled in a manner appreciated by those skilled in the art. A similar actuating arrangement is employed for indicator element 8 as for indicator element 3. A signal source drives a vacuum tube 9 whose bias can be controlled by a bias control 10. The vacuum tube 9 actuates the contactor 12 of relay 11 to cause the indicator element 8 to respond only to a greater value of signal than that to which indicator element 3 is responsive. At this second value of signal both indicator elements 3 and 8 are on. As the signal is further increased, the contactor 13 of relay 14 is actuated by means of vacuum tube 15 so that at another value of signal, beyond the value at which contactor 12 is first actuated, which value is determined by the setting of a bias control 16, the first indicator 3 is deactuated. Thus, as the signal is progressively increased, first indicator element 3 is actuated, then both indicator elements 3 and 8 are actuated and finally indicator element 8 alone is actuated.

When indicator element 3 is "On" the value of signal may be anywhere in the range defined by the value at which relay 4 is first actuated and the value at which relay 11 is first actuated. When both indicator elements 3 and 8 are "On," the value of signal may correspond to a value whose limits are the value at which relay 11 is first actuated and that at which relay 14 is first actuated. Thus, by adjusting the bias controls 7, 10 and 16 the widths of the above two ranges and their location on the signal scale may be readily controlled so that the indication system can be adapted to a variety of uses. If the change in the signal of the variable is gradual, the two indicator elements will be actuated for a fairly substantial length of time whereas if the change is sudden the indicator 8 will be immediately actuated with no appreciable time interval in which both indicators are actuated.

In the embodiment shown an A. C. source of power is used for the indication system. The contactors 5 and 13 are connected in series with the indicator element 3 across the source of power. The contactor 12 is connected in series with the indicator element 8 across the source of power. Power to operate the relays 4, 11 and 14 and vacuum tubes 6, 9 and 15 is obtained from a conventional A. C. to D. C. converter means 17 comprising a transformer 18 and a rectifier tube 19 with the appropriate circuit elements and connections as shown.

In order to appreciate the advantages of the system of the invention, it is in order to mention that a leak detector nozzle, when exploring a surface for leaks, is subject to ambient factors such as small amounts of free gases to which the detector responds in the air and changes in temperature so that the current developed by the leak detector may change even though there be no leak on the surface being explored; however, this change would generally be gradual. An indicator system employing a single indicator consequently might give an erroneous indication of a gas leak if the current had drifted sufficiently because of ambient factors to actuate the indicator. In order to take care of this situation it is desirable to use an indicator system of the kind that unmistakably indicates between sudden and gradual changes in the current, such as disclosed herein. For instance, with a leak detector connected to the indicator system of the invention, as the current from the detector drifts upward due to ambient factors so as to cause the indicator 3 first to become actuated, then indicator 8 along with indicator 3 to become actuated, a control such as a potentiometer 20 inserted between the signal source and the indicator system may be used to cut down the signal available to the indicator system so that only indicator 3 or no indicator at all is actuated; however, when a leak is discovered by the nozzle of the leak detector the current developed by the leak detector will increase suddenly and will increase to a large value so that only indicator 8 is actuated with no appreciable intermediate simultaneous indication of indicators 3 and 8; and hence there could be little question that a leak is present and that the indication is not due to ambient factors.

It will be understood that while I have shown a particular embodiment of my invention, I do not wish to be limited thereto since many modifications may be made and I contemplate by the appended claims to cover any such modifications as follow within the true spirit and scope of my invention.

What I claim as new and desire to secure by Letters Patent of the United States is:

1. An indication system which distinguishes between gradual changes and rapid changes in a variable to which the system is responsive comprising a first indicator responsive to a given value of said variable, a second indicator responsive to second value of said variable, means responsive to a third value of the variable to disconnect said first indicator so that as the variable progressively changes through ranges of value the first indicator is actuated and then the second indicator is actuated along with the first and finally the first indicator is extinguished leaving the second indicator on, whereby the rate of change of said variable is indicated by the length of time said indicators are simultaneously actuated.

2. A device, adapted to be used as an indicator for a vapor detector of the kind which develops an electrical signal which varies in accordance with the amount of the vapor in the vicinity of the detector, comprising a first indicator responsive to a given value of said signal, a second indicator responsive to a second value of said signal, means responsive to a third value of the signal to disconnect said first indicator so that as the signal progressively changes through ranges of signal the first indicator is actuated and then the second indicator is actuated along with the first and finally the first indicator is extinguished leaving the second indicator on, whereby the rate of change of said variable is indicated by the length of time said indicators are simultaneously actuated.

3. A vapor detection system comprising a vapor detector which develops signals in accordance with the amount of vapor in the presence of the detector, a first relay, a second relay, and a third relay connected to said vapor detector and respectively responsive to progressively larger first, second and third values of said signal, the first of said relays having a normally open switch, the second of said relays having a normally open switch, the third of said relays having a normally closed switch, said switches adapted to be actuated upon energization of the corresponding relay, a first indicator, a second indicator, said first indicator being energized by a power circuit including the switches of said first and third relays connected in series relation, said second indicator being energized by a power circuit including the switch of said second relay.

4. In combination with a source of electrical current to be indicated, a first indicator, a second indicator, a first relay, a second relay and a third relay connected to said vapor detector and respectively responsive to progressively larger first, second and third values of said current, the first of said relays having a normally open switch, the second of said relays having a normally open switch, the third of said relays having a normally closed switch, said switches adapted to be actuated upon energization of the corresponding relay, said first indicator being energized by a power circuit including the switches of said first and third relays connected in series relation, said second indicator being energized by a power circuit including the switch of said second relay.

JOHN S. HICKEY, Jr.

REFERENCES CITED

The following references are of record in the file of this patent:

UNITED STATES PATENTS

| Number | Name | Date |
|---|---|---|
| 557,650 | Chockley | Apr. 7, 1896 |
| 1,281,013 | Humphreys | Oct. 8, 1918 |
| 1,469,518 | Leightham | Oct. 2, 1923 |
| 2,047,408 | Emery | July 14, 1936 |
| 2,347,523 | Suksdorf | Apr. 25, 1944 |